May 26, 1925.  
P. CATUCCI  
1,539,646  
FISHING REEL  
Filed Feb. 26, 1924
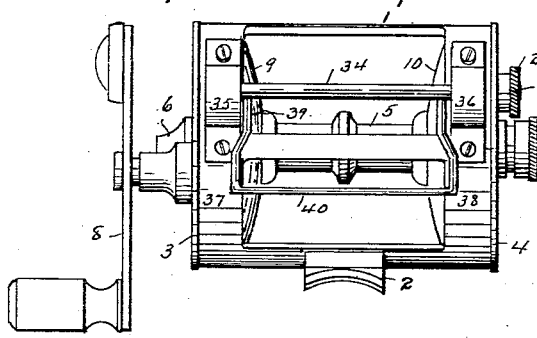
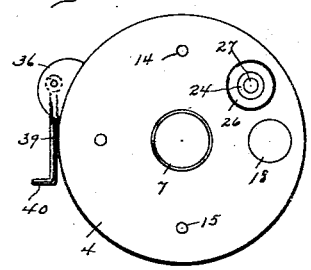
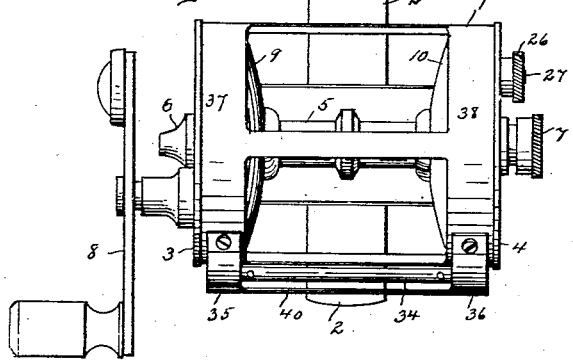
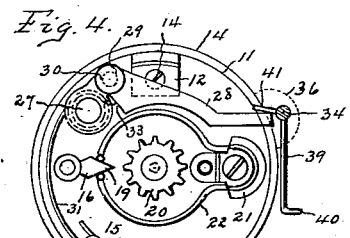
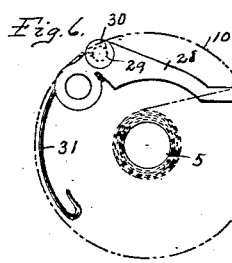
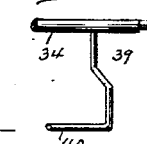
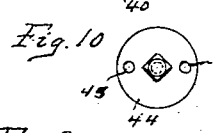
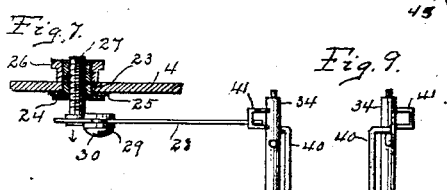
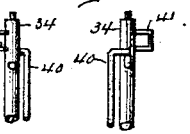
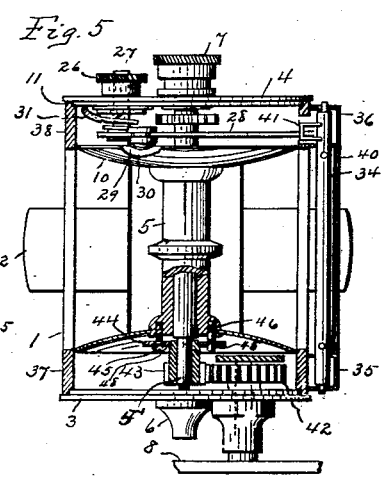
P. Catucci,
INVENTOR.
By Louis M. Sanders
ATTORNEY.

Patented May 26, 1925.

1,539,646

UNITED STATES PATENT OFFICE.

PLINY CATUCCI, OF NEWARK, NEW JERSEY.

FISHING REEL.

Application filed February 26, 1924. Serial No. 695,181.

*To all whom it may concern:*

Be it known that I, PLINY CATUCCI, a citizen of the United States, residing in the city of Newark, county of Essex, and State of New Jersey, have invented a new and useful Improvement in Fishing Reels, of which the following is a specification.

In my prior patent application Ser. No. 576,716, filed July 22, 1922, I have shown a form of fishing reel to which my present invention relates. Such reels are used as bait-casting or fly-casting reels, wherein the line is wound upon the spool of the reel and has a weight or sinker attached to its free end, the purpose being to throw or cast the weight with the bait or fly to as great a distance from the fisherman as possible, allowing the spool to run free and pay out the line as rapidly and with as little retardation as possible. If however at the moment the bait or sinker strikes the water, some provision is not made to check the free running of the spool, its own momentum will cause it to continue to revolve, thus paying out the line after the bait and sinker have struck with the result that the line becomes kinked or snarled.

The purpose of my present invention is to provide the reel, such as set forth in the above application, with the means for checking the rotation of the spool as and when the strain on the line ceases. The device is known in the fishing art as an "anti-backlash" attachment, and my present invention consists in providing the reel of my said application with a tension device for applying a brake to the rim of the spool flange whenever the tension on the line is relaxed, so that when paying out of the line ceases and the tension therein is relaxed the brake may be set upon the spool flange and thus check the further rotation thereof.

Another feature resides in the form and shape of the tension device whereby the fouling of the line is avoided and the means for accomplishing this particular result resides in forming the tension trigger with an offset bend so as to provide a guide for the line as it runs out.

In carrying out my invention, I make use of the structures and devices illustrated in the accompanying drawings wherein, Fig. 1 is a forward or front elevation of the fishing reel with my improved "antiback-lash" device attached thereto.

Fig. 2 is an end view of the reel showing the location of the brake adjusting nut.

Fig. 3 is a top plan view of the reel.

Fig. 4 is a plan view of the inner face of the back plate of the reel showing the location and operation of the tension and brake mechanism.

Fig. 5 is a top plan view of the front and back plates with the brake and tension mechanism in place but with the reel frame in section.

Fig. 6 is a detached side elevation of the brake and tension mechanism.

Fig. 7 is a plan view, partly in section, of the brake and tension mechanism showing the brake adjusting devices.

Figs. 8 and 9 are respectively fractional front and bottom views of the end of the tension device.

Fig. 10 is a plan view of the detachable pinion disc.

Similar reference numerals refer to like parts throughout the specification and drawing.

The reel is made up of the frame or cage 1 to which the foot plate 2 is rigidly secured, the head plate 3 and the back plate 4; the usual spool 5 is mounted to rotate in bearings 6 in the head plate, and 7 in the back plate. The spool is driven by means of the crank 8 with the intervening gear train 42, 43 as usual in such cases. The spool 5 has the usual flanges 9, 10; the back plate 4 is the usual disc provided with shoulder 11 to fit in the end of the tubular frame 1 and is rigidly held therein by means of the two clamping plates 12, 13 fastened at diametrical points on the inner face of back plate by means of the screws 14, 15. The usual sliding diamond pointed click 16 is mounted on the inner face of the plate 4 with the thumb piece 18 connected thereto, so that it may be slipped back and forth toward and away from the center bearing, with the diamond point 19 of said click in position to engage the teeth of the click wheel 20. Mounted beneath the clamping plate 21 is the click spring 22 bent into circular form and having its upturned ends bearing on either side of the diamond point 19. This is the usual click structure and forms no part of my present invention. It is shown and described merely for the purpose of illustrating the complete structure of that part of the reel to which my improvement is attached and for the purpose of showing how the improved 'anti-backlash" device is formed in order to avoid interference with such click mechanism. At a suitable point in the plate 4 is an aperture 23, in which a flanged nipple 24 is inserted from the inner face of the plate, with a friction disc 25 interposed between the flange and the plate; to the outer face of the plate 4 the thumb piece 26 is mounted upon the protruding end of the nipple 24 and secured thereto so as to make comparatively close friction engagement with the plate 4, yet capable of being turned with the fingers. The nipple 24 is internally threaded with a right hand thread to receive the screw threaded stem 27. Upon the inner end of the stem 27 is rigidly mounted the brake lever 28, said brake lever extending across the inner face of the plate 4 to engage the tension device hereinafter described. The brake lever 28 has upon its upper edge the circular slot 29 to receive the small button shaped brake shoe 30, which is made of fibre or hard rubber or any good friction material. The brake shoe 30 is located at a point on the lever 28 so as to bring it in close proximity to the outer edge of the spool flange 10. It will be noted that the free end of the lever 28 may be rocked up and down upon the screw threaded stem 27 as a fulcrum. If rocked upwardly as indicated in Fig. 4 or Fig. 6, the stem 27 will move in the direction of the arrow in Fig. 7, at the same time, the shoe will swing outwardly upon the stem 27 as a center and away from the center of the plate 4, these combined movements carrying the shoe into engagement with the flange 10. The downward movement of the lever 28 will carry the shoe 30 not only downwardly but also laterally away from said flange by reason of screw threaded stem 27; in other words the stem 27 is screwed into the nipple 24 by a downward movement of the lever 28. In order to create an upward bias or tendency for the lever 28, I provide a spring 31, connected at one end to the inner face of the plate 4 by means of the screw 32, carrying the said spring to and around stem 27 with its other end hooked over into notch 33 in the lower edge of the lever 28.

The tension device for operating brake consists of a small shaft 34 mounted in a pair of hooded brackets 35, 36 which are secured respectively to the head and back rings 37, 38 of the reel frame 1. This shaft has depending from it a tension lever or guide 39 in the form of a rectangular or U-shaped wire, the ends of which are inserted into and riveted to the shaft 34; the middle or horizontal section of this wire is forwardly offset as at 40, and such section, it will be noted, is of a length greater than that of the openings between the head and back rings 37, 38. The back ring 38 has an aperture therethrough immediately beneath hooded bracket 36 and through said aperture, the U-shaped arm 41 projects, said arm being mounted upon the end of the shaft 34 in position to engage the outer end of the brake lever 28 as clearly indicated in Fig. 6.

From the structure of the tension device as described it will be readily seen that the guide wire 39, 40 may oscillate up and down and in doing so the U-shaped arm 41, engaging the end of the lever 28 will simultaneously oscillate said brake lever and thus set or release the brake shoe against or away from the flange 10. The fishing line wound upon spool 5 is carried over the shaft 34 and under horizontal part of the tension device as 40 and leads therefrom to the end of the fishing rod. If now a strain is put upon this line it will raise the tension device 39, 40 into a horizontal position thereby rotating the shaft 34 and with it the U-shaped arm 41, thus depressing the outer end of the lever 28 and thereby carrying the brake shoe 30 clear of the flange 10. If the tension in the line is relaxed the spring 31 will tend to elevate the lever 28 and thus swing the tension wire back to the vertical position indicated in Fig. 4 and Fig. 6.

The two features of importance in connection with the improvement are the screw threading of the brake stem 27 and offset bend 40 in the tension device. The screw threaded stem 27 and the nipple 24 with its thumb nut 26 serves as a convenient means for adjusting the position of the brake shoe 30 relative to the flange 10. As above described it will be noted that the thumb nut 26 may be turned so as to screw the stem out or in and thereby make the necessary adjustment as the brake shoe wears. The other feature of the invention, that is the offset bend 40 of the tension device, has overcome the most serious difficulty in "anti-back-lash" casting reels, viz: the fouling of the line when casting. The reason for such fouling is that the line would slip over and around the end of the wire loop and thus the tension of free running line would be ineffective to hold the tension loop elevated and thereby permit the brake to be set before the bait strikes. By placing this offset bend in the wire tension loop the tendency of the line to slip around and over the end of the loop is completely obviated. The slight tension in the line and the tendency of the tension loop 39 to swing downwardly by reason of the spring 31 and brake lever 28, is found to be sufficient to maintain the line always within the offset portion of the tension loop 39, 40.

Another minor improvement resides in the making of the pinion 43 detachable from the spool spindle 5'. In the making of such pinions it is found that in practice, many of them turn out to be defective, and their defects are developed only when the parts of the reel are assembled. It has been the practice hitherto to mount the pinion directly upon the spindle by forcing the same upon the reduced end of said spindle, so as to make the pinion and spindle practicably integral. This entails much trouble and difficulty in replacing the defective pinions. In order to obviate this difficulty I construct a pinion with a center bore of a size to slip over the reduced end of the spindle 43 and to rivet a small disc 44 to the hub of the pinion as clearly shown in Fig. 5. This disc is provided with a pair of diametrically disposed apertures 45, either of which may receive the end of the pin 47, which is inserted in the end of the spool body as clearly shown in Fig. 5, with the holding screw 48 inserted through the other hole. In this manner the defective pinion may be readily discarded and an accurate pinion substituted therefor, without the necessity of forcing the pinion free from the end of the spindle, an operation which frequently results in destroying the entire spool. This construction has resulted in enormous saving in the quantity production of fishing reels of the type above described.

"Anti-back-lash" fishing reels are well known in the art but so far as I am aware I am the first to provide a specific means as indicated for overcoming the fouling difficulties of the prior art and also to provide the simple mechanism for adjusting the position of the brake shoe relative to the braking surface of the spool flange; the latter feature also affords an additional function of a quick brake release because of the screw threading of the stem 27. I therefore desire to claim these two features in combination as broadly as the scope of my invention permits.

I claim:—

1. In a fishing reel, the combination of a reel frame having head and back plates, a spool mounted to rotate between said plates, means for rotating said spool to wind a line thereon, an anti-back-lash device mounted upon the said back plate, comprising a brake lever having a screw threaded stem pivoted upon said back plate, a brake shoe upon said lever and a tension device mounted upon said frame, in engagement with the free end of said brake lever and actuated by the tension in the line for swinging said lever and brake shoe downwardly and outwardly away from the flange of said spool, and a spring upon said back plate engaging said lever to swing the same with said brake shoe into frictional engagement with said spool flange as and when the tension in said line is relaxed.

2. In a fishing reel, the combination with a reel frame, and spool mounted to rotate therein to wind a line thereon of an anti-back-lash device comprising a brake lever having a stem screw-threaded into the back plate of said frame, a brake shoe upon said lever in position to engage the flange of said spool, a tension lever mounted upon said frame and engaging the free end of said brake lever, and a spring mounted upon said back plate for normally biasing said brake lever and shoe into engagement with said spool flange, whereby the strain upon the line will actuate said tension lever to swing said brake lever and shoe free from said spool flange, and the relaxing of said strain will permit said spring to swing said brake lever with its shoe into engagement with said spool flange, and check the rotation thereof.

3. In a fishing reel, the combination with the reel frame and spool, of an anti-back-lash device therefor comprising a brake lever having a stem screw-threaded into the end of said frame for vertical oscillation and endwise movement, a spring normally biasing said lever to upward and inward movement to engage the flange of said spool, and a tension lever pivotally mounted upon said frame to engage and oscillate said brake lever.

4. In a fishing reel, an anti-back-lash device comprising a stem having a right-hand screw thread thereon, an internally threaded nipple upon said stem, means for rotatably mountning said nipple in the back plate of said fishing reel, a brake lever rigidly mounted upon said stem, a brake shoe upon said lever, a spring upon said back plate for normally biasing said lever upwardly and away from said back plate, and a tension lever operatively engaging said brake lever to move the same downwardly and toward said back plate, against the normal bias of said spring.

5. In a fishing reel, the combination with the reel frame and its head and back plates, of an internally threaded nipple mounted to rotate in the back plate, a screw-threaded stem inserted into said nipple, a brake lever rigidly mounted upon said stem and spanning the inner face of said back plate, a brake shoe on said brake lever, and a tension lever engaging the free end of said brake lever to rotate it downwardly, a spring normally biasing said brake lever upwardly, and means for rotating said nipple to adjust said brake lever toward or away from said back plate.

6. In a fishing reel, the combination with the reel frame and its spool, a brake lever pivotally mounted in said frame said lever having a shoe thereon in position to frictionally engage the spool flange and a line tension lever pivotally mounted upon said frame for operating said brake lever, said tension lever comprising a shaft, a U-shaped wire depending therefrom said wire having laterally offset and a forwardly offset bend therein for guiding a line to and from said spool.

7. A tension lever for anti-back-lash fishing reels, comprising a shaft adapted to be pivotally mounted upon a reel frame, a U-shaped tension wire having its ends laterally offset and riveted to said shaft and its middle section forwardly offset to form a line guide.

8. A tension lever for anti-back-lash fishing reels, comprising a shaft adapted to be pivotally mounted upon the reel frame a tension wire bent into flattened U-shape and having its middle section laterally bent to form a line guide, and its ends laterally offset and riveted to said shaft, and a rearwardly extending arm upon an end of said shaft.

PLINY CATUCCI.